Figure 1:
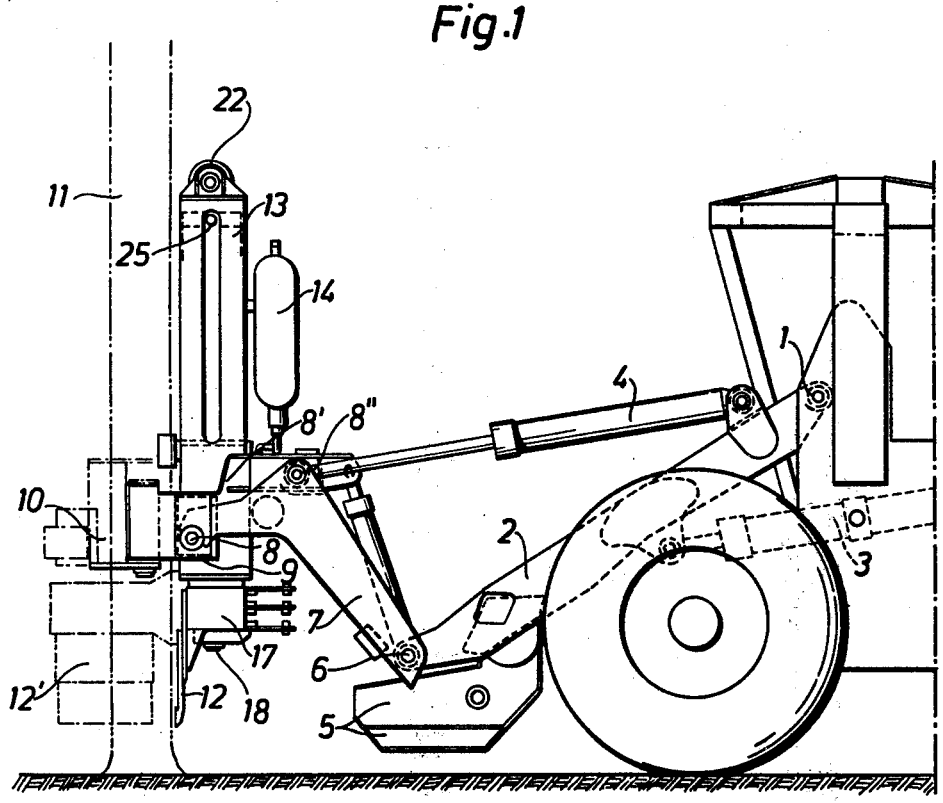

United States Patent [19]

Widegren et al.

[11] 4,141,398
[45] Feb. 27, 1979

[54] METHOD AND APPARATUS FOR SEVERING TREE ROOTS AND FELLING TREES

[75] Inventors: Lars H. Widegren; Tage O. Keskitalo, both of Kiruna, Sweden

[73] Assignee: Firma Elektro-Diesel, Kiruna, Sweden

[21] Appl. No.: 634,104

[22] Filed: Nov. 21, 1975

[30] Foreign Application Priority Data

Nov. 27, 1974 [SE] Sweden ................................ 148909

[51] Int. Cl.² ............................................. A01G 23/08
[52] U.S. Cl. ............................... 144/309 AC; 37/2 R; 144/2 N; 144/34 R
[58] Field of Search .................... 144/2 R, 34 R, 34 E, 144/3 D, 309 AC, 2 N, 34 A; 254/124, 132; 37/2 R; 74/61

[56] References Cited
U.S. PATENT DOCUMENTS

| 3,336,082 | 8/1967 | Bodine, Jr. | 37/2 R |
| 3,433,311 | 3/1969 | Lebelle | 74/61 C X |
| 3,643,920 | 2/1972 | Widegren et al. | 144/34 A |
| 3,738,401 | 6/1973 | Wiklund et al. | 144/34 R |
| 3,914,883 | 10/1975 | Bodine | 37/2 R |
| 3,933,188 | 1/1976 | Boivin | 144/34 R |
| 3,936,960 | 2/1976 | Clegg | 37/2 R |
| 3,989,075 | 11/1976 | Coughran, Jr. | 144/2 N |
| 4,067,369 | 1/1978 | Harmon | 144/2 N |

Primary Examiner—Othell M. Simpson
Assistant Examiner—W. D. Bray
Attorney, Agent, or Firm—Sughrue, Rothwell, Mion, Zinn and Macpeak

[57] ABSTRACT

A standing tree is gripped by a gripping device, lifted and separated from its root system by a cutting device acting in parallel with the longitudinal direction of the tree, the roots being separated from its trunk accelerating the cutting device vigorously relative to the gripping device in the direction away from it, while storing a substantial amount of kinetic energy in the considerable mass cutting parts which in conjunction with the mass of inertia of the tree is used for the cutting of the roots of the tree.

12 Claims, 3 Drawing Figures

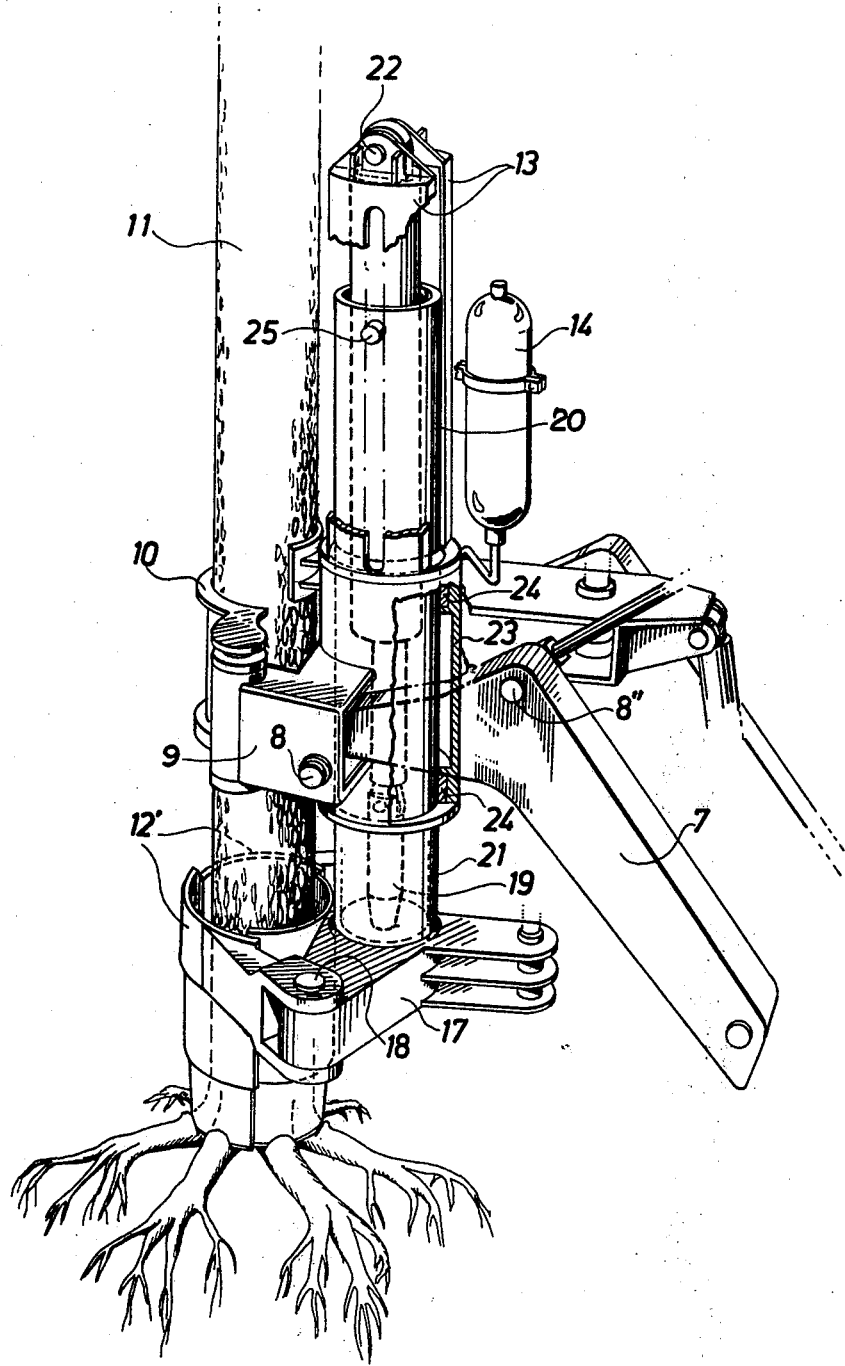

METHOD AND APPARATUS FOR SEVERING TREE ROOTS AND FELLING TREES

The earlier practice in timber-felling was to separate the standing tree from its root system essentially perpendicular to its length, so leading a stump. There have been proposals in recent years to fell trees by separating them from laterally projecting roots by means of downward-directed cutting devices, and lifting the thus released truck out of the ground. This admittedly gives a better yield of timber, but the cutting devices are readily damaged by any stones in the soil close to the roots, especially when the soil is frozen (Swedish Pat. No. 314,854).

Another disadvantage of such a device is that the devices which grip the trunk must serve as brace and support for the devices which cut off the roots. Since the gripping devices must transmit to the trunk a force corresponding to the force required to drive the cutting devices through the roots, it is not usually sufficient that the gripping devices grip only the bark, but they must penetrate through the bark a bit into the trunk. The gripping devices are applied above the cutting devices which is in the boarding area. The gripping tools often damage the timber boarding used because they penetrate through the bark and into the timber.

Through the Swedish Specification No. 369,469 available for public inspection, a tree-felling apparatus is known in which the load on the gripping devices is relieved by pressing a bracing device down through the soil at or near the roots so as to be brought from below into engagement with the roots or a portion thereof, after which the cutting devices are pressed down in the known manner through existing roots and their junction with the trunk in order to separate them from the trunk under the bracing action of the underlying bracing means. Even if it has been possible in this way greatly to reduce the damage done by the gripping devices, at least theoretically, it is difficult in practice to press the bracing means down through the soil, since it may come up against laterally projecting roots or stones in the soil. The soil may also be frozen.

The object of the present invention is to reduce the gripping force required for application of forces acting upwards or essentially in the longitudinal direction of the tree in the pulling up of trees and/or separation of their roots.

This problem is solved in a manner not customary or known hitherto in mechanized tree-felling, namely through the use of pulsating force for root separation, while liberating stored kinetic energy, and of the mass of inertia of the tree.

The procedure according to the invention for reduction of the gripping force required in timber-felling, by which a standing tree is gripped by a gripping device, lifted at least a bit and thereafter separated from its root system by a cutting device acting parallel to the length of the tree or at an angle thereto. In this procedure the roots are separated from the trunk by the cutting device or a part of it which is accelerated vigorously in relation to the gripping device and in the direction away from it the gripping device. A substantial amount of kinetic energy is used in conjunction with the mass of inertia of the tree for the separation of the roots.

The cutting device or part of it can be accelerated periodically by the application of repeated power impulses. Especially for root separation in several steps the cutting device can be better accelerated if it is retracted a bit before the next power impulse is applied. The cutting device may on each occasion be retracted either for an equally long time or the same distance, which has the advantage that the cutting device obtains essentially the same acceleration for every cutting operation.

Another possibility within the scope of the invention is that a force composed of an essentially constant component and an oscillating component is applied to the cutting device. Preferentially, the constant component should advance the knife in the cutting direction, while the oscillating component produces the reciprocal motion of the cutting device, with repeated accelerations towards the roots. The oscillating component can be given an impact-like character, i.e. a smooth return motion and a sudden sharp forward motion.

According to one embodiment of the invention the oscillating component can be regulated in frequency and amplitude or peak value. This may be regulated so that the frequency of the component falls with increasing amplitude, and vice versa.

The cutting device can, within the scope of the invention, be brought into operation at different times. According to one embodiment it is proposed that the cutting device be brought into operation after the tree has been gripped and pulled up a bit. In practice this may mean that the tree is lifted only slightly in order to produce a free space under the root system, in which any stones between roots can move aside on collision with the cutting device. After being cut off, the roots return largely to their original positions in the soil and the tree is removed upwards, while an opening is left in the centre of the root system.

Another possibility is that the cutting device is brought into operation after the tree has been gripped and drawn up and been completely released from the soil. The roots can then be drawn out of the soil and made use of. This, moreover, avoids insect attack and the growth of mould fungus on roots remaining in the soil and has a favourable effect on the soil.

The invention relates also to an apparatus for implementation of the procedure according to the invention, with a gripping device for standing trees and a cutting device for separating the tree from its roots or a portion thereof. According to the invention the apparatus is characterized essentially in that the cutting device or gripping device is connected to a power source arranged to produce a striking, oscillating or periodically varying relative motion between the cutting device and the tree or gripping device. According to one embodiment of the invention the power source consists of a hydraulic piston-cylinder device which is hydraulically connectable to a hydraulic pump and to a hydraulic pressure accumulator. According to another embodiment of the invention the power source is composed of a hydraulic piston-cylinder device which is hydraulically connectable to a hydraulic pump and to a percussion mechanism acting mechanically upon the cutting device. The percussion mechanism may be hydraulically, electrically or mechanically driven. A powerful vibrator may also be used as the percussion mechanism.

In order to reduce still further the damage done by the gripping device, according to a further development of the apparatus according to the invention the cutting device may be made up of several knives or groups of knives which can be brought into operation together or alternatively. In such case all knives or groups of knives may have a common power source or each knife or group of knives may have its own separately connectable power source. It is also proposed according to one embodiment of the invention that all knives or groups of knives should be connected to a common hydraulic piston-cylinder device but to individual percussion mechanisms.

In another embodiment the knives are divided longitudinally and the two parts are displaceable relative to one another, e.g. are guided in one another. The lower cutting part does not accompany the upper part in the return motion but remains in its depressed position in the roots of the tree, while only the upper part returns to the starting-point before the next power impulse is applied. This has an effect similar to that when, for example, a wedge is driven in by a sledgehammer. The advantage is gained that the power impulse is not braked by friction forces before the cutting edge has again reached the bottom of the cut from the preceding depression. The power impulse thus acts directly upon the blade.

In the case of very large side-roots or thick junction between the roots and trunk a larger number of strokes with intermediate return may be necessary. With increasing depth of knife penetration the friction between the knives and the tree then also increases and the resulting force must be taken up by the gripping device. For further improvement it is proposed according to the invention that any return motion of the knives should be utilized to produce a certain "planing effect" or the like, so broadening the groove produced by the cutting device and reducing the friction at the next stroke. According to a special embodiment of the invention this is achieved through the fact that the knives or groups of knives are furnished with file-, rasp- or plane-like blades or similar devices designed to remove wood during the return motions of the knives. These blades can be placed on the side of the knives facing away from and/or towards the tree. Apart from the reduction of the jamming force on the knives at the next penetration, this "planing effect" has another advantage, namely that the risk of collision with stones in the passage of the blades diminishes, since the path of motion of the knives can to a greater extent than before be placed inside the external contours of the root-trunk junction. With present methods of timber-felling the junction between roots and trunk is also an obstruction to transport and debarking and in the sawing up of the trunk. This drawback is unexpectedly reduced through this embodiment.

Another possibility of facilitating the root separation and thus reducing the gripping force required is to furnish one or more knives with an extra cutting edge at an angle to the plane of the knife and parallel to the desired cutting direction. In this way the roots, in being separated, are split at the same time, which assists the penetration of the knives, since the roots can more easily move aside. It also becomes easier to deal with the roots, since most of the laterally projecting roots separate from one another.

Figure 2:
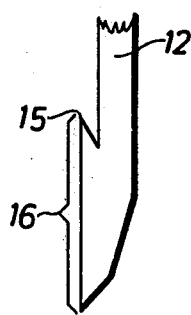

The invention will now be explained with reference to an embodiment shown in the attached drawings, but without being limited to this construction, which can be modified freely within the scope of the subsequent claims. The drawings show:

FIG. 1 a side-view of a tree pulling device combined with a periodically striking root separating device, FIG. 2 a side-view of a root cutter, FIG. 3 a perspective view in somewhat enlarged scale of a part of the device shown in FIG. 1.

The FIGS. 1 and 3 show the application of the invention using a modified excavating machine 1 with a boom 2 and, coupled to it, a hydraulic lifting cylinder 3 and hydraulic pull up cylinders 4 on each side of the boom. The pull up cylinders 4 pull up the trees to be felled. The front portion of the boom is attached to a ground-support 5 which rests upon the ground when the boom is lowered. At the front end of the boom an L-shaped pulling-up arm 7 is linked to a pivoting point 6, the upper end of the arm is linked by means of a pin 8" to the piston-rod of the pulling-up cylinder 4. At the front end of the pulling-up arm 7 located on the pull up arm 7 there is a pulling-up unit 9 which swivels around a pivoting point 8. This unit exhibits a gripping device 10 which grips the tree 11 to be felled after the pulling-up unit 9 has been correctly prepositioned relative to the tree 11. Below the gripping device 10 there is a cutting device 17 which, in the embodiment here shown, consists of a rear fixedly secured knife 12 and two front knives 12' one on each side rotatable around vertical shafts 18.

It should be observed that the cutting device 17 is fixedly secured to a vertical guiding cylinder 21 and to piston rod 19 which is pivoted in a piston which in turn is movable up and down within a hydraulical cylinder 20 which is pivoted in its upper end by means of a pin 22 in the vertical guide 13. The hydraulic cylinder 20 is arranged within the guiding cylinder 21.

The guiding cylinder 21 slides within a mantle 23 having sliding bushings 24. In FIG. 3 the cutting device is moved downwards to cut the roots. The cutting device 17 is movable along the length of the tree and relative to the gripping device by a piston-cylinder device 19, 20, 21, inside a vertical guide device 13.

The hydraulic piston-cylinder device 19, 20 constitutes the power source for the cutting device 17 and is hydraulically connectable to the hydraulic pump in the machine and to a hydraulic pressure accumulator 14. This pressure accumulator 14 is dimensioned to produce a large hydraulic flow of the order of a few 1000 l/min at high pressure during the relatively short time required for acceleration of the cutting device 12 towards the root system for separation of it from the tree. The return of the cutting device is designed to take place only through the action of the hydraulic pump, which at the same time recharges the hydraulic pressure accumulator for the next acceleration.

The cutting device 17 and the parts 19 and 21 of the guide 13 have a considerable mass. With this high mass, a considerable amount of kinetic energy is when these parts are accelerated to a high velocity. This energy is then released in the cutting action of the knives 12 which are connected to the considerable mass parts 17, 19, 21 and 13. The inertia due to the mass of the stationary tree assists in holding the tree against the impact of the blades. This reduces damage to the tree which may be caused by the gripping device. In order that the gripping device 10 may effectively hold the tree 11, it should be equipped with ribs, preferentially placed obliquely in relation to the length of the tree, or other means penetrating more or less deeply into the tree. The holding capacity of the gripping device is largely dependent on the area of its engagement with the tree. The larger this area of engagement, however, the greater will be the damage so caused. In the manner proposed in the invention the areas of grip can be essentially limited to the part which subsequently is lost as boarding when the tree is sawn into construction timber.

The form of the cutting device with a rear knife and two swivelling front knives has the additional advantage that the cutting of the roots can be divided into a larger number of phases — starting, for example, by using only the rear fixed knife, while the two swivelling front knives do not cut, but through their mass assist in exercising a great kinetic force against the part of the root system which is to be separated. When the rear knife 12 has passed entirely through the root system, the cutting device is moved back, after which a front knife or both knives are swung into working position and the cutting procedure is repeated until the entire root system has been separated. In the case of small trees or weak root systems, of course, all three knives can be put onto operation simultaneously. The division of the cutting device into three groups of knives 12, 12' means that the cutting force can be divided into several phases and in each phase the gripping force to be exercised by the gripping device 10 can be lowered, which further reduces the damage to the trunk caused by it.

As indicated above, the hydraulic accumulator and the hydraulic acceleration of the knives for the cutting work can be replaced by a percussion mechanism acting mechanically on the cutting device, with hydraulic, pneumatic, electrical or mechanical drive, or in the form of a vibrator. It is also possible to act upon the cutting device with a constant force directed against the root system and a superimposed oscillating component, for example with reciprocating motion, which produces a return movement and new acceleration of the cutting device towards the root system.

Practical embodiments of the device according to the invention have shown that good results can be attained with the said hydraulic pressure accumulator. As the length of cut through the root system may amount to several decimeters, several strokes are often required before the knife or group of knives in use has entirely penetrated through the root system. It has not been found necessary to return the entire cutting device to starting position before each new stroke, but some saving of time can be gained if the length of return movement before the next stroke is made constant.

It has been found that the effective depth of penetration from stroke to stroke has a tendency to diminish, not only due to the area of cut which usually increases with increasing depth of penetration in the root-trunk junction, but also due to jamming forces. These jamming forces constitute an unnecessary load on the gripping device and, according to a detail shown at FIG. 2, the knives or group of knives 12 can be furnished with upward-directed blades 15 or similar arrangements which, in the return movement of the knives, chip off a part of the trunk to allow space for the knife and limit the area of contact of the knife 12 to the surface 16 between the point of the knife and the edge of the blades 15 or part thereof. This reduced area of contact reduces the friction losses.

The blades 15 may either be turned towards the tree, which has the advantage, among others, that the knives 12 can be brought closer to the centre axis of the tree and more of the junction between roots and trunk, which is a disturbance in the later handling of the tree, can be removed. If the blades 15 are placed on the side of the knives remote from the tree, the advantage is gained that the chipping effect is somewhat better, as the chipping takes place in the direction of the fibres and at an appropriate acute angle to the root fibres.

The form, number and placing of the blades 15 can be further varied. The blades may, for example, be divided longitudinally and guided in one another. In cutting off of the roots the lower bladed portion remains in engagement with the tree, while the upper portion follows the accelerating return movement.

What is claimed is:

1. A method of tree cutting and removal whereby said tree is removed without the application of high forces to the gripping means which would otherwise damage said tree, comprising the steps of:
   gripping said tree with a gripping means,
   severing the tree roots by a cutting means which is moved downward, substantially parallel to said tree,
   actuating said cutting means periodically by accelerating it vigorously, thereby
   accumulating a substantial amount of kinetic energy in the cutting means by accelerating said cutting means relative to said gripping means which is used for cutting said roots,
   moving the tree upwards, thereby removing it from its location while severing the roots.

2. The method according to claim 1 wherein the cutting means is accelerated periodically by the application of repeated power impulses.

3. The method according to claim 1 wherein the cutting means is accelerated relative to the gripping device in a direction away from the gripping device.

4. The method according to claim 1 wherein a force composed of an essentially constant component and an oscillating component is applied to the cutting means.

5. The method according to claim 1 wherein the cutting means is brought into operation after the tree has been gripped and felled to a more horizontal position.

6. The method according to claim 2 wherein the cutting device is partially retracted prior to application of the next power impulse.

7. The method according to claim 4 wherein, in the backward movement of the cutting device, the tree is planed off, whereby the area of contact between the roots and the cutting device is reduced.

8. The method according to claim 4, wherein the oscillating component is given a percussion-like character.

9. The method according to claim 4 wherein the oscillating component is regulatable in frequency and amplitude.

10. The method according to claim 8 wherein the frequency of the oscillating component is decreased when the amplitude is increased.

11. The method according to claim 1 wherein the cutting means is brought into operation after the application of an upward force to the tree and root system which partially lifts the tree from the ground.

12. A method of tree cutting and removal whereby said tree is removed without the application of high forces to the gripping means which would otherwise damage said tree, comprising the steps of:
   gripping said tree with a gripping means,
   moving the tree upwards, thereby removing it from its location,
   severing the tree roots by a cutting means which is moved substantially parallel to said tree,
   actuating said cutting means periodically by accelerating it vigorously, thereby
   accumulating a substantial amount of kinetic energy in the cutting means by accelerating said cutting means relative to said gripping means which is used for cutting said roots.

* * * * *